United States Patent [19]
Abbott, III et al.

[11] Patent Number: 5,974,837
[45] Date of Patent: Nov. 2, 1999

[54] METHOD FOR COATING FIBERS

[75] Inventors: John S. Abbott, III, Elmira, N.Y.; Richard R. Williams, Wilmington, N.C.

[73] Assignee: Corning Incorporated, Corning, N.Y.

[21] Appl. No.: 08/612,469

[22] Filed: Mar. 7, 1996

Related U.S. Application Data

[62] Division of application No. 08/409,231, Mar. 23, 1995.

[51] Int. Cl.$^6$ .......................... C03C 25/02; C03C 17/02; B05C 3/12
[52] U.S. Cl. ................. 65/432; 65/529; 65/443; 65/474; 427/163.2; 118/420
[58] Field of Search ..................... 118/420, 424, 118/DIG. 19, 67, 68, 69; 427/163.2; 65/432, 529, 435, 443, 444, 474

[56] References Cited

U.S. PATENT DOCUMENTS

| | | | |
|---|---|---|---|
| 4,154,592 | 5/1979 | Bailey | 65/2 |
| 4,704,307 | 11/1987 | Jochem et al. | 427/117 |
| 4,792,347 | 12/1988 | Deneka et al. | 65/3.11 |
| 5,320,658 | 6/1994 | Ohga et al. | 65/3.11 |
| 5,383,946 | 1/1995 | Naka et al. | 65/443 |

FOREIGN PATENT DOCUMENTS

| | | | |
|---|---|---|---|
| 0 579 388 | 1/1994 | European Pat. Off. | 37/27 |
| 54-131042 | 10/1979 | Japan . | |
| 1286941 | 11/1989 | Japan | 25/2 |

*Primary Examiner*—Stanley S. Silverman
*Assistant Examiner*—Jacqueline A Ruller
*Attorney, Agent, or Firm*—William J. Simmons, Jr.; Robert L. Carlson

[57] ABSTRACT

In the process of drawing optical fibers, a protective plastic coating is applied to the fiber by applying a curable liquid coating material thereto and the subsequently curing the liquid coating to a protective plastic layer. At high fiber draw speeds, air entrained with the fiber enters the liquid coating material and causes bubbles in the cured coating. The incidence of bubbles in the coating is reduced by replacing air adjacent the fiber surface with helium.

12 Claims, 2 Drawing Sheets

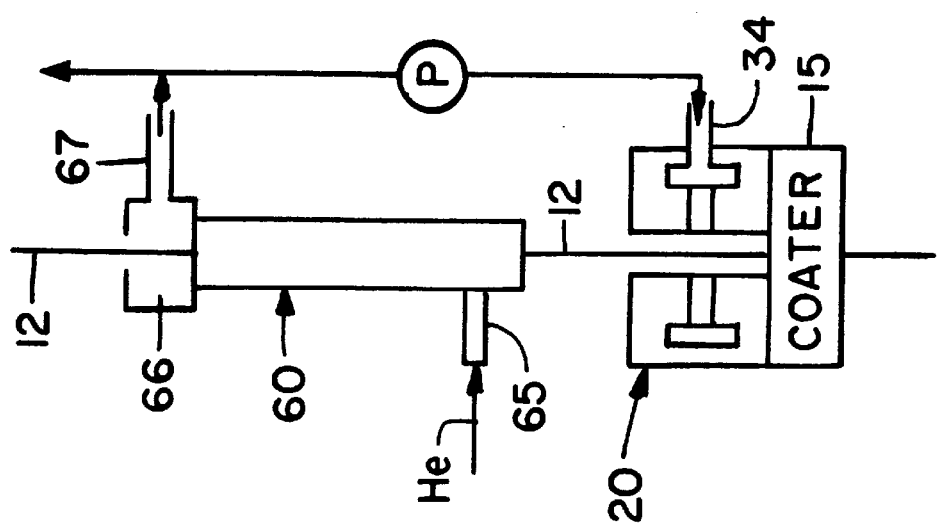
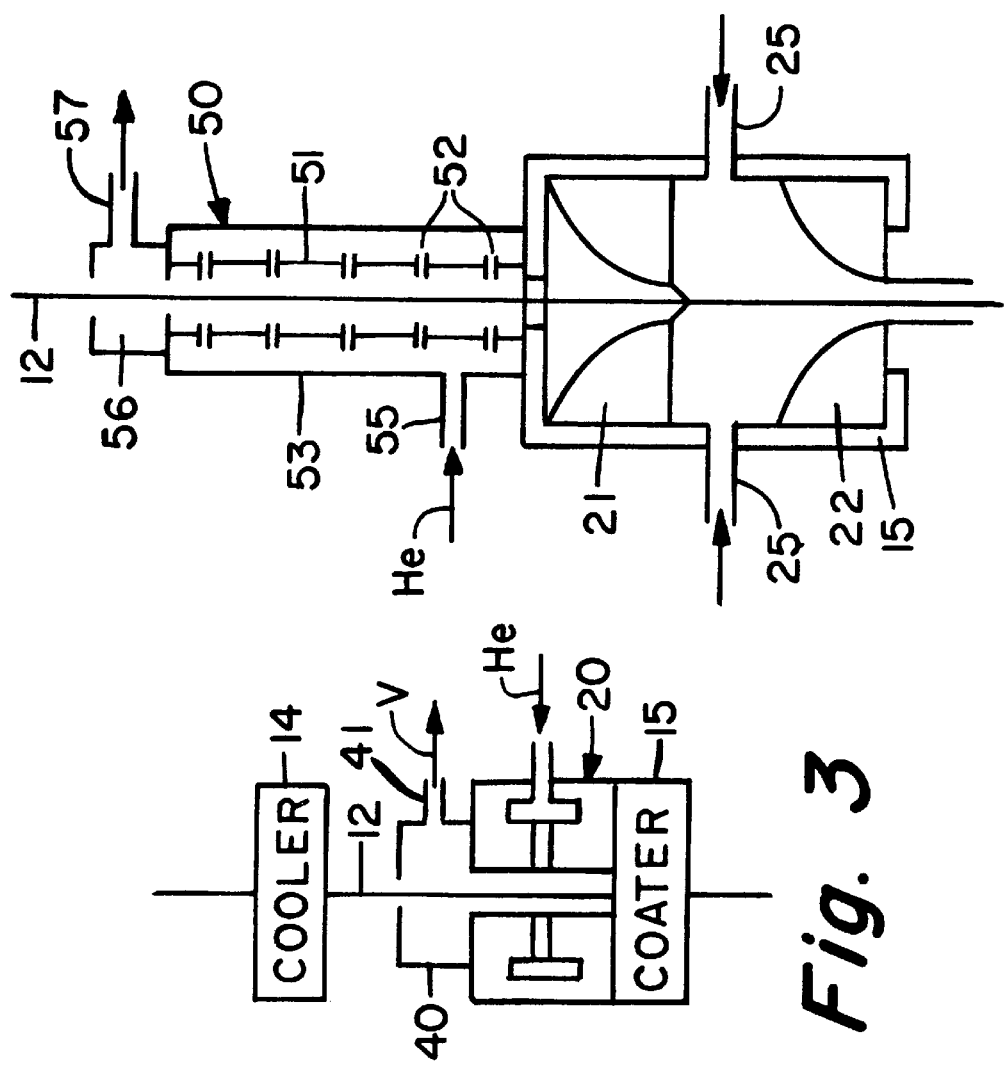

METHOD FOR COATING FIBERS

This is a division of application Ser. No. 08/409,231, filed Mar. 23, 1995.

BACKGROUND OF THE INVENTION

A. Field of the Invention

The present invention relates to the coating of fibers with liquid-applied organic materials which are thereafter cured to form solid protective organic coatings on the fibers, and more particularly, to the coating of glass optical waveguide fibers.

Fibers are frequently provided with a coating for protection against mechanical damage, for insulation, for identification and for other purposes. An optical fiber, for example, is drawn from a source such as a crucible or preform and then passes successively through a cooling tube, one or more coating means, and a draw mechanism such as a tractor; it is then wound on a spool. A diameter measuring means is located between the source and the cooling tube; another diameter measuring means is optionally located after the coating means. The drawn optical fiber should be provided with a protective coating prior to its coming into contact with any other surface such as the draw tractor.

An optical fiber is coated by drawing it through a container of liquid coating material and then through a sizing die where excess coating liquid is removed from the fiber. As the fiber traverses downwardly through the surface of the coating material, it draws the surface down and forms a meniscus. As draw speed increases, the meniscus penetrates deeper into the liquid coating material. Above a certain draw speed, the surface of the coating material is essentially tangent to the fiber surface at the point where the two surfaces contact, and incipient air entrainment occurs. Below a certain draw speed, this incipient air that is entrained into the coating dissolves and is not seen in the coating. As the draw speed increases, more air is entrained, until a limit is reached, and visible bubbles are seen in the fiber coating. Oxygen in the entrained air inhibits curing of the coating. Moreover, excessive bubbles are considered to be a visual defect and, when sufficiently numerous or sufficiently large, may induce microbending loss in the optical fiber.

B. Description of the Prior Art

U.S. Pat. No. 4,704,307 (Jochem et al.) and C. M. G. Jochem et al., "High-Speed Bubble-Free Coating of Optical Fibers on a Short Drawing Tower", Proc. IOOC-ECOC'85 (Venice, Italy, Oct. 1–4, 1985), pp. 515–518 relate to a method and apparatus for providing a bubble-free coating on optical fibers that are drawn at speeds higher than those at which similar coatings can be drawn when air surrounds the fiber at the point of entry into the liquid coating material. C. M. G. Jochem et al. teach that when the area in which the fiber and coating material meet is surrounded by a purge gas having a comparatively low kinematic viscosity (lower than that of air), the risk of bubble formation is reduced in that such a gas is less readily taken along by the fiber. Argon, Xenon and $CCl_2F_2$ are said to be suitable purge gases.

U.S. Pat. No. 4,792,347 (Deneka et al.), which is incorporated herein by reference, teaches a method for applying a protective coating to an optical fiber by applying a curable liquid coating material thereto and subsequently curing the liquid coating to form a protective plastic layer. Air is purged or displaced from the surface of the fiber prior to the application of the liquid coating material thereto by replacing air adjacent the fiber surface with a purge gas that preferably exhibits high solubility in the liquid coating material and resists bubble formation in the liquid coating layer as it is formed. The Deneka et al. patent states that suitable purge gases are nitrogen, carbon dioxide, and the Group VIII or so-called noble gases, e.g., xenon, neon, argon or the like, and that chemically inert halocarbon gases or vapors thereof, such as chloroform, Freon® halocarbons, or other chlorine- or fluorine-substituted hydrocarbons may also be considered. All of the purge gases mentioned in U.S. Pat. No. 4,792,347 displace the oxygen that is present in air and hence reduce its inhibiting effect on cure. For example, nitrogen does not reduce bubbles in the applied coating, although it is a safe and inexpensive gas to displace oxygen from above the coating. Argon functions in a similar manner.

Helium is not mentioned in U.S. Pat. No. 4,792,347 as one of the noble gases which would be suitable for preventing bubbles in the applied coating. Helium was not considered to be a good candidate for a purge gas since U.S. Pat. No. 4,704,307 and the aforementioned C. M. G. Jochem et al. publication teach that the kinematic viscosity of a purge gas should be sufficiently low, i.e. lower than that of air, and helium is listed in Table 2 (page 516) of the C. M. G. Jochem et al. publication as having a kinematic viscosity of $110.0 \times 10^{-6}$ which is 7.43 times greater than that of air. Moreover, Table 2 and the text of the Jochem et al. publication lead one to believe that helium was tried experimentally and (independent of the theoretical explanation) did not reduce bubbles in practice.

SUMMARY OF THE INVENTION

An object of the invention is to provide a method and apparatus for preventing the formation of bubbles in an optical fiber coating, which apparatus employs a gas that is readily accessable at optical fiber draw towers. Another object is to provide a method and apparatus for cooling a newly drawn optical fiber and simultaneously preventing the formation of bubbles in a coating applied to the optical fiber.

The present invention provides a method for coating an optical fiber which aids in preventing bubble formation in the coating. Coatings are applied to fibers by drawing the fiber through a body of a curable liquid coating composition, removing excess coating liquid from the fiber and curing of the coating liquid to form a solid protective layer. In accordance with the invention, the atmosphere surrounding the fiber at the point of entry thereof into the liquid coating composition comprises an amount of helium effective to reduce the occurrence of bubbles in the solid protective layer. The atmosphere can comprise substantially pure helium or a mixture of helium and at least one other gas. The helium atmosphere is more effective if it is directed toward the fiber in one or more jets to displace entrained air from the fiber.

When an optical fiber is being drawn, it traverses cooling means prior to entering the coater. If the cooling means employs helium to cool the drawn fiber, helium exhausted from the cooling means can be fed to the apparatus that displaces air from the fiber.

That end of the cooling means from which the cooled fiber exits can be situated immediately adjacent the housing that contains the liquid coating material so that air cannot become entrained with the fiber after it passes out of the cooling means and before it passes into the coating liquid.

BRIEF DESCRIPTION OF THE DRAWINGS

FIG. 3 schematically illustrates optical fiber coating apparatus provided with means for evacuating the region surrounding the fiber prior to its passing into air displacing means.

FIG. 4 schematically illustrates an apparatus wherein a single device simultaneously functions as a cooler and air displacing means.

FIG. 5 schematically illustrates an apparatus for utilizing recycled helium from a fiber cooling means as the purge gas.

DETAILED DESCRIPTION

Figures 1, 2:
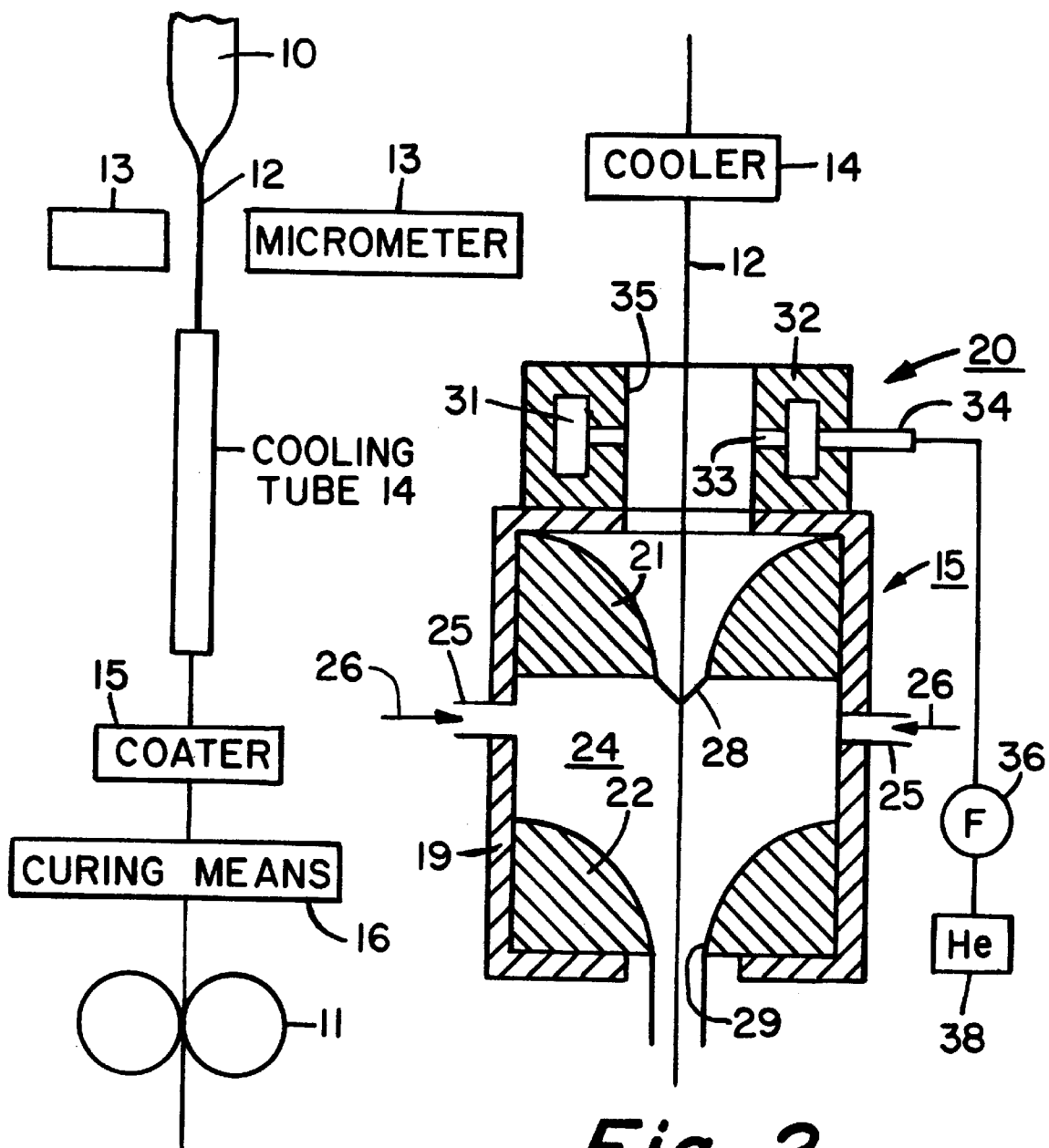
FIG. 1 schematically illustrates an optical fiber drawing system.
FIG. 2 schematically illustrates optical fiber coating apparatus provided with means for displacing air from a fiber.

A fiber drawing system into which the present invention is incorporated is shown in FIG. 1. The system comprises a glass preform 10, at least the tip of which is molten, and a pair of tractors 11 for drawing fiber 12 from the molten glass. The output of optical micrometer 13 is coupled to a control system which regulates the speed of tractors 11 to control fiber diameter. Fiber 12 passes through a coater 15 which applies a protective material thereto, and thereafter, it may pass through a curing means 16. By "curing" is meant any technique for converting the liquid coating material into a solid protective coating. At high draw speeds it is necessary to employ means 14 to cool the fiber to a temperature which does not detrimentally affect the coating material applied at coater 15.

Fiber cooling means 14 often consists of a tube that surrounds the fiber 11; a coolant gas flows through the tube. The coolant gas can flow through slots, holes or porous material so that a component of the coolant gas flows radially toward the fiber (see U.S. Pat. No. 4,437,870, for example). Even though the coolant gas may strip at least some of the air that had been entrained with the fiber that entered the cooler 14, more air is entrained with the fiber as it travels from cooling tube 14 to coater 15.

Heretofore, the draw apparatus has been provided with a device for displacing air from the surface of the fiber prior to applying the liqid coating material. FIG. 2 shows an air displacing apparatus 20 of the type disclosed in U.S. Pat. No. 4,792,347 and an optical fiber coater 15 of the type disclosed in U.S. Pat. No. 4,531,959.

Coater 15 comprises an entrance die 21, exit die 22, and a liquid coating chamber 24 which are situated in housing 19. A pressurized supply of liquid coating material (not shown) is connected to ports 25 to supply chamber 24 with a replenishable charge of coating liquid 26. The upper surface 28 of this coating liquid comprises the entrance surface through which the fiber to be coated passes upon entering the die. As fiber 12 is drawn through surface 28, a meniscus is formed. Exit die 22 includes an exit orifice 29 positioned downstream of the reservoir of coating material for removing excess coating material from the fiber surface prior to its exit from the coater.

Air displacing apparatus 20 is positioned atop coater entrance die 21, i.e. upstream of the entrance die with respect to the direction of fiber transport through the unit. This air displacing unit is immediately adjacent the entrance surface of the liquid coating material and directly controls the atmosphere above that surface. The air displacing unit comprises a housing 32 in which are situated a plurality of gas flow channels 33 that are connected to an annular chamber 31. Purge gas from source 38 flows through flow meter 36 and is introduced into the air displacing apparatus through port 34. The purge gas enters chamber 31 and then flows through flow channels 33 and into cylindrical aperture 35 to provide a controlled flow of gas against the surface of the moving fiber to efficiently sweep entrained air therefrom.

It is well known to those expert in the field of heat transfer (and noted, for example, in U.S. Pat. No. 4,437,870 and the aforementioned C. M. G. Jochem et al. publication) that the heat transfer from an optical fiber to a gas in the cooling tube depends on the thermal properties of the gas and that the heat conducting properties of hydrogen and helium are much better than those of air. Helium is the better candidate for use in the cooling tube since it is undesirable to use hydrogen in the vicinity of the outlet end of the draw furnace.

In accordance with the present invention, helium was also used as the purge gas in the apparatus 20 of FIG. 2 which was employed in conjunction with an optical fiber draw apparatus of the type shown in FIG. 1. Optical fiber 12 was a conventional single-mode step index telecommunication fiber having an outside diameter of 125 $\mu$m. The fiber cladding was pure silica. An ultraviolet light curable liquid acrylate coating composition was used to coat the fiber. Commercially available (at least 99.9% pure) helium was supplied to port 34 of the air displacing apparatus at a flow rate of 7 standard liters per minute. The resultant coated fiber was viewed under a microscope to determine whether there were any bubbles in the coating. At a draw rate of 16 meters per second no bubbles appeared in the coating. Draw rate was not limited by the onset of bubbles in the coating. Rather, draw rate could not be increased above 16 meters per second since the available ultraviolet light in the coating curing means could not completely cure the coating above that draw rate.

In experiments conducted with air over the liquid coating material (no purging gas), the onset of the appearance of bubbles in the coating occurred at a draw rate of 4 to 5 meters per second.

Helium is a safer gas to use than previously proposed gases such as $CO_2$, $CCl_2F_2$, xenon and the like since it is both non-toxic, and, because of its lower density, it rises and diffuses out of the building, so there is a reduced danger to personnel.

Mixtures of helium and other gases could also be used in the apparatus of FIG. 1 to prevent the formation of bubbles in the coating. For example, helium could be mixed with a gas such as $CO_2$ or $CCl_2F_2$ since $CO_2$ and $CCl_2F_2$ are suitable for bubble elimination when used alone. Moreover, helium could be mixed with a gas such as air or nitrogen which is known to cause bubbles at high draw speeds. The amount of helium needed to be added to another gas depends on process conditions, particularly the draw speed, the temperature and viscosity of the coating, and the relative effectiveness of each of the gases in the purge gas mixture. Another factor is the manner in which the helium/gas mixture is applied to the vicinity of the fiber surface. If a helium/air purge gas mixture were employed, less helium would be needed if the purge gas flowed in jets toward the fiber as shown in FIG. 2 than if the purge gas merely flowed upwardly through cylindrical aperture 35. The maximum draw speed at which fibers with bubble-free coatings could be drawn with an air/helium purge gas would be lower than the maximum draw speed at which fibers with bubble-free coatings could be drawn with a pure helium purge gas. Furthermore, if there is residual helium near the surface of the fiber from the fiber cooling apparatus, particularly if that apparatus extends to a position close to the coater, less helium purge gas may be required.

FIG. 3 shows an embodiment whereby helium can be provided at low pressure to the surface of the coating liquid.

After fiber 12 passes through cooling means 14, it traverses an evacuated chamber 40 that is connected a source of vacuum by port 41. Fiber 12 then enters air displacing apparatus 20 where the helium jets strip the remaining air from the fiber. This arrangement might further increase the maximum possible draw speed that can be attained before bubbles appear in the coating.

In a draw apparatus in which helium is used as the purge gas, a fiber cooling means 50 that utilizes helium as the coolant gas can be extended downwardly and affixed to the coater as shown in FIG. 4. Cooling means 50 comprises a central tube 51 having slots 52 therein. Tube 51 is surrounded by outer tube 53 to which gas inlet port 55 is connected. At the top of tube 51 is an exhaust chamber 56 to which exhaust port 57 is connected. Helium enters tube 53 from port 55 and passes through slots 52 to form jets that are directed toward fiber 12. The helium and any entrained air that entered the cooling means with the fiber is exhausted through port 57. In this embodiment the helium performs two functions; it cools the fiber, and it displaces or strips air from the fiber, whereby a helium containing atmosphere surrounds the fiber at the point of its entry into the coating liquid. This is advantageous at very high draw speeds at which it is more difficult to displace the entrained air from the fiber above the coater.

In the embodiment of FIG. 5, air displacing means 20 is situated below and spaced from cooling means 60 which is similar to means 50 illustrated in FIG. 4. Helium enters cooling means 60 from port 65 and cools fiber 12 as described in conjunction with FIG. 4. The helium and any entrained air that has entered the cooling means with the fiber is exhausted through chamber 66 and port 67. At least a portion of the helium/air mixture is fed to port 34 of displacing means 20. The remainder of the helium/air mixture can be exhausted.

The surface characteristics of the optical fiber may also be advantageously modified as disclosed in the aforementioned U.S. Pat. No. 4,792,347. Vapors of chemical species which improve glass surface compatibility with liquid coating materials can be introduced with the purge gas. Examples of such species include conventional silane coupling agents; alternative surface treating agents might include monomers or additives already present in the liquid coating prepolymer.

Whereas a previously discussed example concerns the coating of a glass optical fiber, fibers made of other materials such as plastic or metal will also benefit from the helium air-displacing method described above. Moreover, optical fibers are often provided with two protective coatings. In such a fiber drawing system, air is entrained on the primary coating during its traverse of the curing means and before it enters the second coater. The air entrained on the primary coating can be displaced by a helium-containing atmosphere as described above to reduce the formation of bubbles in the secondary coating.

We claim:

1. A method for continuously coating a fiber with a substantially bubble free coating comprising the steps of surrounding said fiber with helium at the point at which said fiber enters the meniscus of a liquid coating composition, drawing said fiber through a body containing said liquid coating composition, removing excess coating liquid from the fiber, and curing the coating liquid to form a solid protective layer thereon, wherein said fiber passes through cooling means prior to its passing into said coating liquid, and wherein said helium is provided by flowing said helium toward said fiber in an air displacing region located between said coating liquid and said cooling means.

2. The method of claim 1 wherein said fiber passes through cooling means prior to its passing through said coating liquid, and wherein said air displacing region is spaced from said cooling means.

3. The method of claim 1 wherein said coating liquid is contained in a coater and wherein said fiber passes through cooling means prior to its passing through said coater, and wherein said cooling means is located immediately adjacent said coater so that air cannot become entrained with said fiber after it passes out of said cooling means and before it passes into said coating liquid.

4. The method of claim 3 wherein jets of helium containing gas are directed toward said fiber as it passes through said cooling means.

5. The method of claim 1 wherein said fiber is subjected to a reduced pressure prior to its passing into said helium.

6. A method for coating a fiber with a substantially bubble free coating comprising the steps of:
positioning an air displacing apparatus containing an atmosphere of helium adjacent to and above a liquid coater containing a liquid coating composition,
drawing the fiber through the air displacing apparatus and surrounding the fiber with helium as the fiber exits the air displacing apparatus,
drawing the fiber through the liquid coater such that the fiber is surrounded by helium as it enters the coating composition, and
curing the coating liquid to form a solid protective layer thereon, wherein the fiber passes through cooling means prior to its passing into the coating liquid, and wherein the atmosphere is provided by flowing the atmosphere toward the fiber in an air displacing region located between the coating liquid and the cooling means.

7. The method of claim 6 wherein the fiber passes through cooling means prior to its passing through the coating liquid, and wherein the air displacing region is spaced from the cooling means.

8. The method of claim 6 wherein the fiber passes through cooling means prior to its passing through the coater, and wherein the cooling means is located immediately adjacent the coater so that air cannot become entrained with the fiber after it passes out of the cooling means and before it passes into the coating liquid.

9. The method of claim 8 wherein jets of helium containing gas are directed toward the fiber as it passes through the cooling means.

10. The method of claim 6 wherein the fiber is subjected to a reduced pressure prior to its passing into the atmosphere.

11. A process for continuously coating a fiber with a substantially bubble-free coating comprising the steps of:
passing said fiber through cooling means;
drawing said fiber through a coater containing a liquid coating composition;
surrounding said fiber with helium such that at the interface at which said fiber enters the entrance surface of said liquid coating composition said entrance surface has an atmosphere comprising helium in an amount which is effective to provide a substantially bubble-free coating after curing;
drawing said fiber out of said liquid coating composition, and
curing said liquid coating composition on said fiber, wherein an atmosphere which surrounds said fiber downstream of said coater and prior to said curing step has a lower helium concentration than the atmosphere surrounding said fiber at said interface.

12. A process for continuously coating a fiber with a substantially bubble-free coating comprising the steps of:

passing said fiber through cooling means;

drawing said fiber through a coater containing a liquid coating composition;

prior to coating said fiber, establishing a flow of He gas against said fiber to sweep entrained air therefrom and surrounding said fiber with helium such that at the interface at which said fiber enters the entrance surface of said liquid coating composition said entrance surface has an atmosphere comprising helium in an amount which is effective to provide a substantially bubble-free coating after curing;

drawing said fiber out of said liquid coating composition, and curing said liquid coating composition on said fiber.

* * * * *